(12) United States Patent
Angelov et al.

(10) Patent No.: US 9,173,101 B1
(45) Date of Patent: Oct. 27, 2015

(54) ACQUIRING CLIENT DEVICE DATA

(71) Applicant: MicroStrategy Incorporated, Vienna, VA (US)

(72) Inventors: Konstantin Angelov, Vienna, VA (US); Peng Xiao, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 121 days.

(21) Appl. No.: 13/873,477

(22) Filed: Apr. 30, 2013

Related U.S. Application Data

(60) Provisional application No. 61/785,471, filed on Mar. 14, 2013.

(51) Int. Cl.
*G06F 21/00* (2013.01)
*H04W 12/08* (2009.01)
*H04W 12/00* (2009.01)

(52) U.S. Cl.
CPC .............. *H04W 12/08* (2013.01); *H04W 12/00* (2013.01)

(58) Field of Classification Search
CPC ............................. H04W 12/00; H04W 12/08
See application file for complete search history.

(56) References Cited

U.S. PATENT DOCUMENTS

2002/0073044 A1* 6/2002 Singhal ............................ 705/64
2014/0025519 A1* 1/2014 Thomas .......................... 705/21

OTHER PUBLICATIONS

Apple Passbook card-'n'-ticket app paves way for iOS e-wallet [online], [retrieved on Jun. 14, 2012]. Retrieved from the Internet: http://www.theregister.co.uk/2012/06/12/apple_passbook/, 3 pages.
Masabi and MBTA to launch first smartphone rail ticketing system in the US [online], [retrieved on Jun. 14, 2012]. Retrieved from the Internet: http://www.abe-industry.com/railim/index.php/en/newsflash/788-masabi-and-mbta-to-launch-first-smartphone-rail-ticketing-system-in-the-us.html, 2 pages.
Masabi Launches U.S.'s First Ticketless Rail System [online], [retrieved on Jun. 14, 2012]. Retrieved from the Internet: http://blogs.wsj.com/tech-europe/2012/04/23/masabi-launches-u-s-s-first-ticketless-rail-system/, 4 pages.
Masabi the ticket machine in your pocket, Transport Operators and Barcode M-Ticketing, "Expand station sales capacity without spending more on staff and ticket machines," [online], [retrieved on Jun. 14, 2012]. Retrieved from the Internet: http://www.masabi.com/wp-content/uploads/2011/02/Transport-Operators-and-Barcode-mTicketing.pdf, 2 pages.

* cited by examiner

*Primary Examiner* — Shewaye Gelagay
*Assistant Examiner* — Kendall Dolly
(74) *Attorney, Agent, or Firm* — Fish & Richardson P.C.

(57) ABSTRACT

In one implementation, a processing system receives a request from a client device to access a user account of the user. In response to receiving the request, the processing system transmits credential data, which corresponds to a credential and which indicates client device data to transmit in response to receiving the credential data. The processing system receives the client device data from the client device, identifies an issuer of the credential, and transmits the client device data to the issuer of the credential.

19 Claims, 8 Drawing Sheets

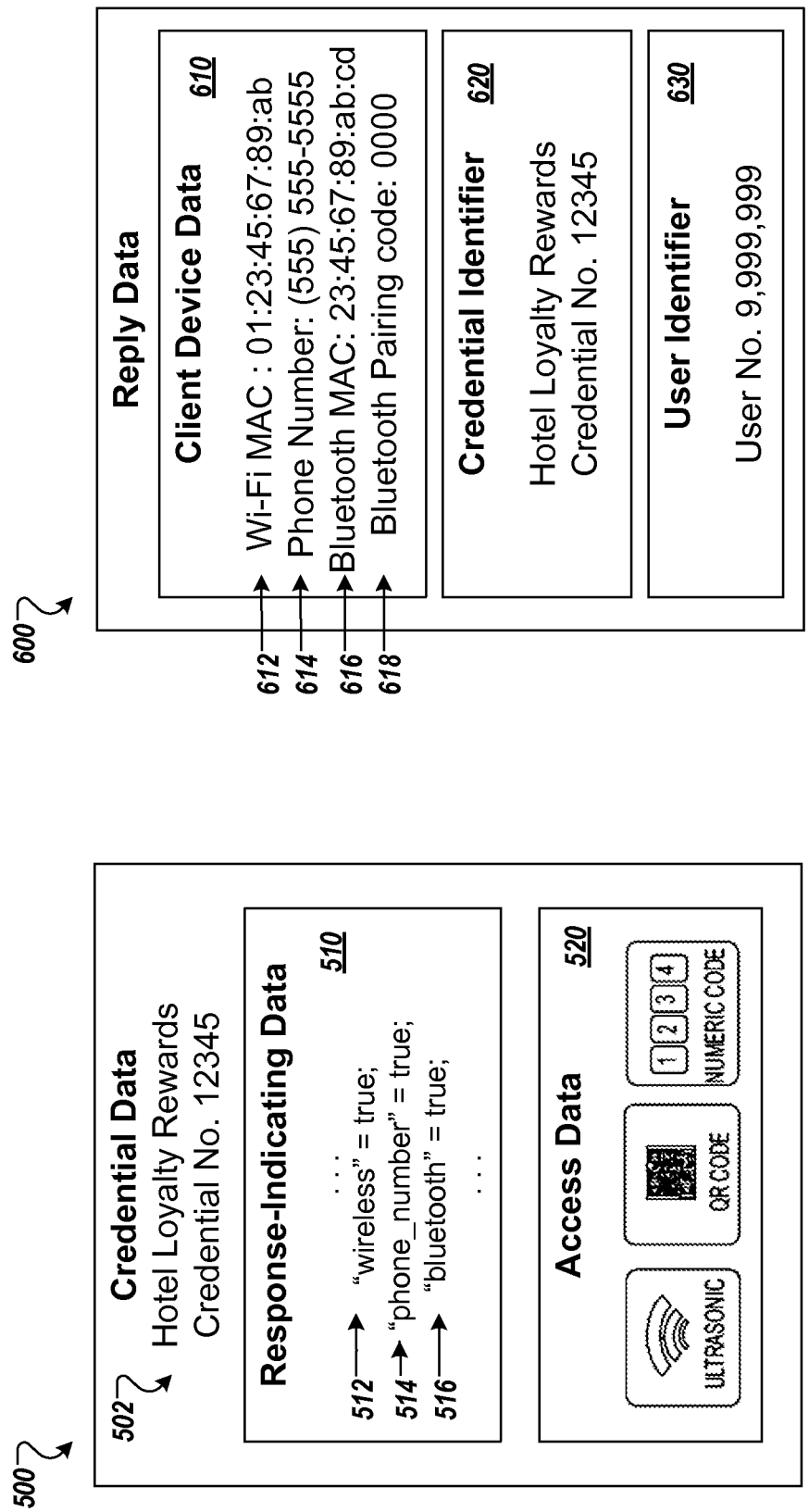

ACQUIRING CLIENT DEVICE DATA

CROSS-REFERENCE TO RELATED APPLICATION

This application claims the benefit of U.S. Patent Application Ser. No. 61/785,471, filed on Mar. 14, 2013, which is incorporated herein by reference in its entirety.

TECHNICAL FIELD

This specification generally relates to acquiring client device data.

BACKGROUND

A person may be associated with a credential that, for example, permits the person to access resources and/or services.

SUMMARY

In general, one aspect of the subject matter described in this specification may include a method that includes the actions of: receiving, at a server system, a request from a client device to access a user account of a user, wherein the user account provides access to one or more credentials associated with the user; in response to receiving the request from the client device to access the user account of the user, transmitting, from the server system to the client device, credential data corresponding to a credential associated with the user, the credential data indicating client device data to transmit in response to receiving the credential data; receiving, at the server system, reply data transmitted by the client device in response to receiving the credential data, the reply data comprising the client device data indicated by the credential data; and in response to receiving the reply data, identifying, at the server system, an issuer of the credential to which the credential data corresponds; and transmitting, by the server system, the client device data to the issuer of the credential.

In general, another aspect of the subject matter described in this specification may include a method that includes the actions of: receiving, at a client device, credential data corresponding to a credential associated with a user, the credential data enabling the user to access the credential at a client device; evaluating, by the client device, the received credential data, and determining, by the client device and based on the evaluation, that the credential data indicates client device data should be sent to a server system associated with an application that provides the client device with access to one or more credentials; and in response to determining, by the client device and based on the evaluation, that the credential data indicates client device data should be sent to a server system associated with an application, transmitting the client device data from the client device to the server system.

In general, another aspect of the subject matter described in this specification may include a method that includes the actions of: receiving, by a first processing system, a request from a client device to access a user account of a user, wherein the user account provides access to one or more credentials associated with the user; in response to receiving the request from the client device to access the user account of the user, transmitting, by the first processing system and to the client device, credential data corresponding to a credential associated with the user, the credential data instructing the client device to transmit a device identifier in response to receiving the credential data; receiving, by the first processing system, reply data transmitted by the client device in response to receiving the credential data, the reply data comprising a device identifier of the client device; in response to receiving the reply data, determining, by the first processing system, that the second processing system is associated with an issuer of the credential to which the credential data corresponds; and in response to determining that the second processing system is associated with the issuer of the credential to which the credential data corresponds, transmitting, by the first processing system, the device identifier of the client device to the second processing system. The method may further include the actions of: receiving, by the second processing system and from the first processing system, the device identifier of the client device; receiving, by the second processing system, a device identifier from the client device; determining that the device identifier received from the client device matches the device identifier received from the first processing system; determining, by the second processing system, that the client device should be granted access to a wireless network based on having determined that the device identifier received from the client device matches the device identifier received from the first processing system; and in response to determining that the client device should be granted access to a wireless network, providing, by the second processing system, the client device access to the wireless network.

Other implementations of these aspects include corresponding systems, apparatus, and computer programs configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description, below. Other features will be apparent from the description and drawings, and from the claims.

DESCRIPTION OF DRAWINGS

FIG. 5 is a block diagram that illustrates an example of credential data transmitted from a server system to a client device.

FIG. 6 is a block diagram that illustrates an example of reply data transmitted by a client device to a server system.

DETAILED DESCRIPTION

Users can be associated with various credentials. The credentials can be, for example, identity credentials (driver's licenses, passports, visas, police badges, etc.), health insurance cards, loyalty cards, badges reflecting membership in a group (e.g., employees of a company, graduates of a college, gym club memberships, etc.), badges to gain entrance to a location or event, a ticket for entry to a location or event, a key that unlocks a lock (e.g., for entry to a location), etc. Credentials can be maintained on and/or accessed from client devices (e.g., mobile computing devices like smart phones and tablet computers).

A server, or collection of servers, can manage and distribute credentials to appropriate users' client devices. When a credential is distributed to a client device, information about the client device can be captured and returned to the server that manages the credential. Later, the captured information can be used to grant the client device access to a logical resource associated with the credential. For example, the downloading of a user credential to a client device may trigger the client device to send the Media Access Control (MAC) address of the client device's Wi-Fi adapter to a credential management server. Then, the MAC address can be used to automatically grant the client device access to a Wi-Fi network. For instance, the MAC address can be included in an access list indicating devices associated with the credential. The devices included in the access list automatically can be provided access to the Wi-Fi network, while devices that have not received the credential may be denied access, or may be required to perform further authentication procedures before being granted access to the Wi-Fi network.

Techniques for acquiring device data and managing user credentials are described below. First, a general description of example implementations will be described. Then, more detailed implementations are described.

Figure 1:
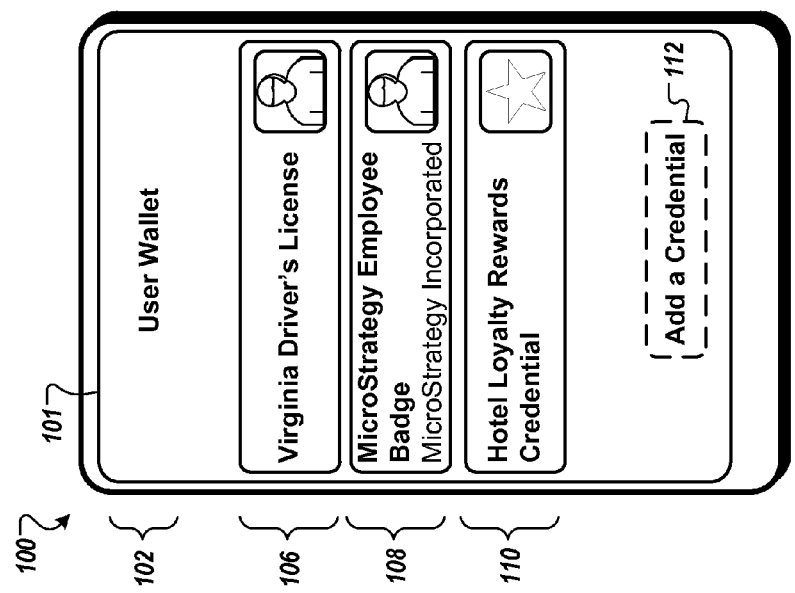
FIG. 1 is an illustration of an example of a user interface that indicates various credentials associated with a user.

FIG. 1 shows an example user interface 101 that shows various credentials belonging to a user. The user interface 101 is displayed on client device 100, such as a mobile phone, a tablet computer, a laptop computer, a navigation device, etc. The user interface 101 may be displayed by a credential management application that runs on the client device 100 and/or a network-based platform.

The user interface 101 includes an example of a user's wallet (identified with a "User Wallet" caption 102) that provides the user access to and information about multiple credentials associated with the user. For example, the user interface 101 includes a "Virginia Driver's License" 106, a "MicroStrategy Employee Badge" 108, and a "Hotel Loyalty Rewards Credential" 110. In some instances, as discussed further below, the user (or the user's device) automatically can be granted access to logical resources based on possession of one or more credentials that have been received by the client device 100. The user also can select a particular credential from the user's wallet in order to output a representation of the credential from the user's client device 100. The user may make the selection, for example, by touching the corresponding area on a presence-sensitive display of the client device 100. A representation of a credential may provide information that identifies the user and/or validates the user's possession of the credential. Examples of representations can include, for example, a code encoded within an ultrasonic signal, bar codes, numeric or alphanumeric codes, images, etc.

To add an additional credential to the client device 100, the user may select an "add credential" control 112 in the user interface 101. In some instances, the client device 100 automatically adds new credentials as the new credentials become associated with the user. For example, when the user logs into the credential management application, the credential management application may determine whether a new credential has been associated with the user (e.g., since the user's previous interaction with the application). If so, the credential management application makes the new credential operational on the client device 100, for example, by downloading credential data that enables the new credential to be used.

When the client device 100 receives a new credential, the client device 100 may determine whether any information about the client device 100 or the user should be returned to the credential management system in response to receiving the new credential. For example, the client device 100 may determine, based on downloaded credential data, that a particular type of device identifier (e.g., a MAC address, a serial number, etc.) of the client device 100 should be returned to the credential management system in response to receiving the new credential. As a result, the client device 100 may provide the device identifier to a server system for the credential management application. The server system can associate the device identifier with the credential, so that the device identifier is known to identify a client device of a user possessing the credential.

Figure 2:
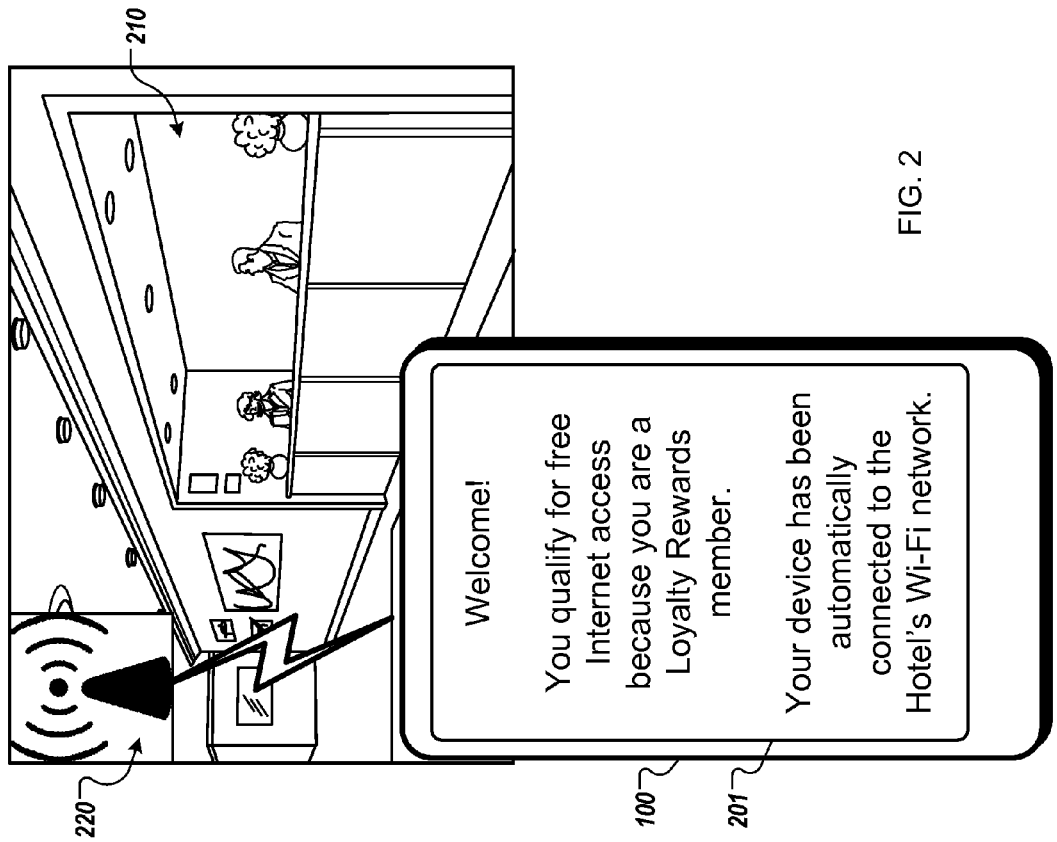
FIG. 2 is an illustration of an example of a user automatically receiving access to a resource based on a credential.

FIG. 2 shows an example of the client device 100 automatically receiving access to a logical resource based on possession of a credential. In the example, the user brings the client device 100 to a hotel 210 and is given free access to a Wi-Fi network 220 because the user is a member of the hotel's loyalty rewards program.

Before the user visited the hotel 210, the "Hotel Loyalty Rewards Credential" 110 was distributed to the client device 100, as shown in FIG. 1. When the credential 110 was distributed, the client device 100 provided its Wi-Fi MAC address to a server system associated with the credential management application in response to receipt of the credential 110. The server system then provided the MAC address to the hotel, permitting the hotel to add the MAC address to an access list indicating devices belonging to loyalty rewards members.

As the user enters the hotel, the client device 100 interacts with the hotel's wireless network 220. The wireless network 220 is configured to provide free Internet access to members of the loyalty rewards program, and to require other customers to pay for access. The wireless network 220 detects the MAC address of the client device 100 and evaluates it against the access list for devices of loyalty rewards members. Because the client device 100 previously provided its MAC address in response to receiving the credential 110, the MAC address for the client device 100 is included in the access list. As a result, the wireless network 220 recognizes the client device 100 as a device associated with a loyalty rewards member and establishes a network connection. In some implementations, the connection is established automatically, for example, without any user input being supplied to the client device 100 in order to initiate or establish the connection. In this manner, access to a logical resource (e.g., the Wi-Fi network 220) is provided to the client device 100, without requiring user action.

The user interface 201 indicates that the client device 100 has been connected to the network free of charge because the user is a loyalty rewards member. The user may be notified through one or more channels, for example, via the credential management application or another application, an electronic mail message, a text message, a voice message, a web page, etc. As an example, in some implementations, the client device 100 provides its phone number when the client device 100 receives the credential 110. When the user arrives at the hotel and the Wi-Fi network 220 detects the presence of the client device 100, the hotel may send a text message to the phone number welcoming the user and indicating that free, automatic Wi-Fi access is enabled for the client device 100.

Other types of data may be gathered when a credential is received by the client device 100. For example, a loyalty rewards credential for a rental car company may indicate that the Bluetooth MAC address of the client device and the Bluetooth pairing code should be transmitted. With this data, the rental car company could configure a rental car for the user to automatically pair with a Bluetooth system in the rental car. As another example, a teacher's credential at a school may also indicate that Bluetooth information should be obtained, so that the client device 100 may automatically connect to a projector or other equipment in a classroom.

Additionally or alternatively, in some implementations, the addition of a credential to client device 100 may trigger the generation of a new digital certificate associated with the user and the client device 100. In such implementations, the addition of the credential to client device 100 may trigger the client device 100 to generate a public/private key pair. In addition, the addition of the credential to client device 100 may trigger the distribution of a password (e.g., a one-time password) associated with a certificate authority to be distributed to the client device 100, for example, according to the simple certificate enrollment protocol (SCEP). The client device 100 then may generate a certificate signing request for a digital certificate that confirms that the public key is associated with the client device 100 and transmit the certificate signing request to the certificate authority along with the password. Responsive to successful validation of the password, the certificate authority may issue and return the requested digital certificate to the client device 100. Thereafter, the client device 100 may use the digital certificate to authenticate itself to one or more logical resources. For example, the client device 100 may use the digital certificate to authenticate the client device 100 to a Wi-Fi network 220 so as to enable the client device 100 to connect to Wi-Fi network 220 in a manner that is transparent to the end-user.

In general, the issuer of a credential may specify the types of data that should be provided when the issuer's credential is distributed to a client device, allowing the issuer of the credential to obtain any appropriate information needed to enable automatic access to logical resources by client devices that have received the credential. The issuer of a credential may delegate management and distribution of a credential to a third party (e.g., an entity that provides the credential management application). The third party can obtain appropriate client device data from the client device, and then relay the client device data to the issuer of the credential. The issuer of the credential may then use the client device data to customize or personalize the user experience of the user that received the credential.

Figure 3:
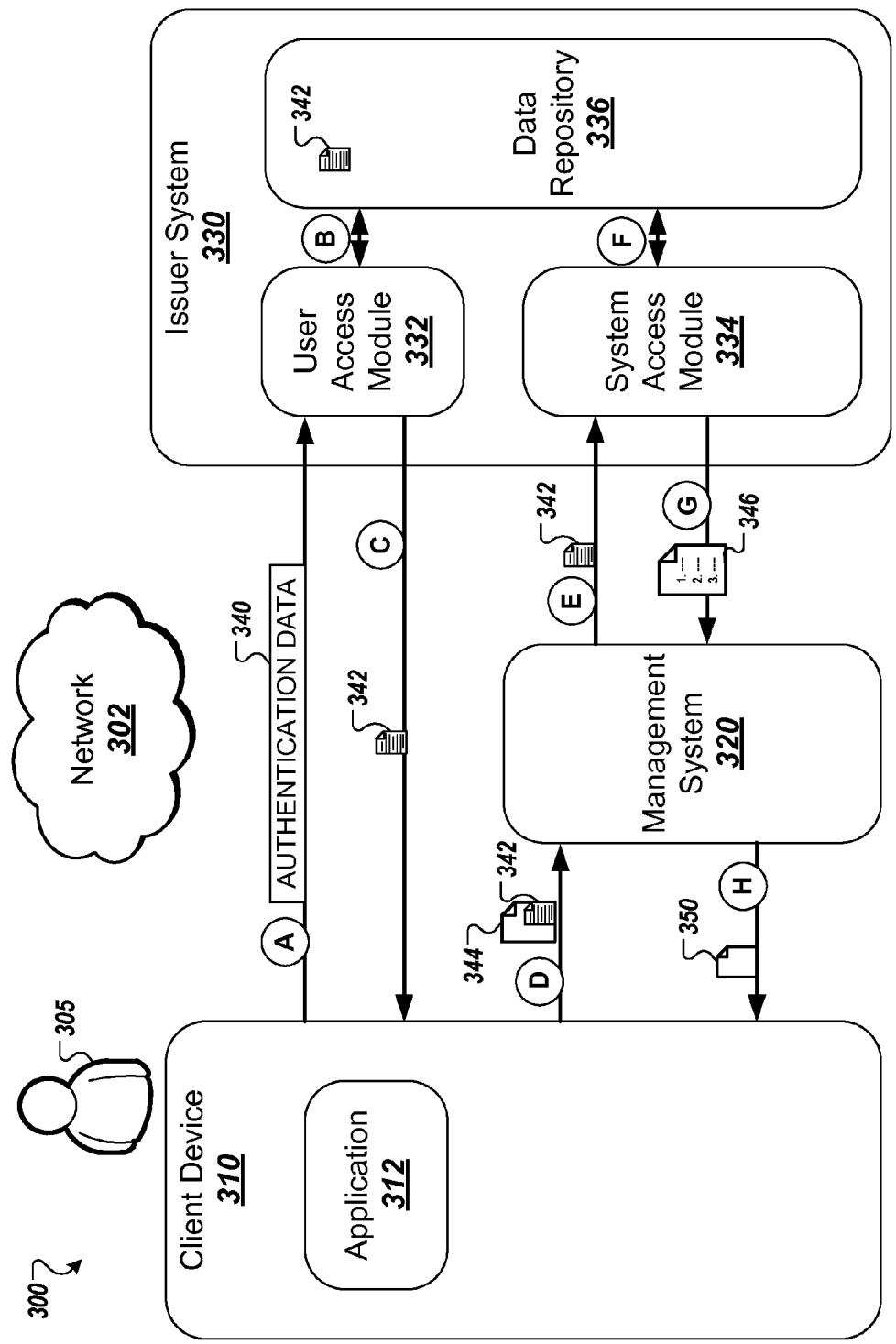
FIG. 3 is a diagram of an example system for distributing a user credential to a client device.

FIG. 3 shows an example system 300 for managing user credentials. The system 300 includes a client device 310, a management system 320 for a credential management application, and an issuer system 330 for a credential issuing organization (referred to as the "issuer"). Some or all of the interactions may occur over a network 302, which may include private and/or public networks, such as the Internet. The figure shows stages (A) to (H), which represent a flow of data, and which may occur in the order shown or in a different order.

The client device 310 can be a mobile computing device, such as a smart phone or tablet computer associated with a user 305. The client device 310 may run or otherwise access an application 312 that provides access to one or more credentials associated with a user of the client device 310. For example, the application 312 may associate the client device 310 with a user account for the user 305 in a credential management system.

The management system 320 may be operated by an entity that is independent from the issuer of a credential. In such implementations, the management system 320 operates as a trusted platform that one or more credential issuers can use to distribute and manage credentials for multiple users. For example, the management system 320 may allow multiple different issuers to issue credentials that a user can access with a single application. The management system 320 can be a server system that includes one or more computing devices.

The issuer system 330 includes a user access module 332, a system access module 334, and a data repository 336. The user access module 332 allows interaction with the client device 310. In some implementations, the user access module 332 provides an interface, such as a user login page, to receive user authentication data. The system access module 334 permits the issuer system 330 to communicate with the management system 320. For example, the system access module 334 can provide information to and receive information from the management system 320 in a standardized message format. Using the system access module 334, the issuer system 330 can provide data regarding each credential that the issuer desires to offer to facilitate management by the management system 320. In some implementations, the system access module 334 has an electronic address, such as a network address or Uniform Resource Locator (URL), that is designated for communication with the management system 320.

During stage (A), the client device 310 communicates with the issuer system 330. The client device 310 provides authentication data 340, such as a user name and password for the user 305 assigned by the issuer of the credential. As an example, when the issuer is a hotel, the user 305 may log in to a user account for the hotel through a website for the hotel.

In some implementations, the user 305 interacts with the application 312 and indicates a desire to add a particular credential to the client device 310. In response, the application 312 requests the credential from an appropriate computing system. For example, in response to user input that the hotel loyalty reward credential should be obtained, the application 312 may direct the client device 310 to an interface for the issuer system 330, permitting the user 305 to provide the authentication data 340 to the issuer system 330.

During stage (B), the issuer system 330 authenticates the user 305 by evaluating the authentication data 340. For example, based on the authentication data 340, the issuer system 330 may identify the user 305 and verify that the user 305 is who she represents herself to be. In response to authenticating the user 305, the issuer system 330 generates a user token 342 for the user 305 (or accesses an existing user token 342 for the user 305), and stores the user token 342 in the data repository 336. In some implementations, the user token 342 may include a long sequence of characters or bits (e.g., a string with 40 characters, or 100 characters, or 200 characters, etc.) that would be difficult or impossible to guess. The user token 342 may be uniquely assigned to the user 305 (e.g., not simultaneously assigned by the issuer system 330 to any other user).

The issuer system 330 can also identify a credential to issue to the user 305. In some implementations, the credential may have been issued to the user 305 in another form. For example, a credential such as a driver's license may have been issued in the form of a card. As another example, the credential may have been issued electronically to another device associated with the user 305, but may not have been issued to the client device 310. The issuer system 330 may select, from among a set of credentials that the user 305 is authorized to receive, one or more credentials that have not been issued to the client device 310.

During stage (C), the issuer system 330 transmits a copy of the user token 342 to the client device 310. The user token 342 may be unique to the user 305, permitting the user token 342 to uniquely identify the user 305. Possession of the user token 342 can also indicate permission to act on behalf of the user 305.

During stage (D), the client device 310 transmits a request 344 to the management system 320, for example, a request to receive one or more credentials. For example, the application 312 can request that the management system 320 provide the particular credential issued by the issuer that controls the issuer system 330. As another example, the request 344 may be a general request to retrieve any or all of the credentials associated with the user 30. As another example, the request 344 may simply be a request to access the user's account, which may trigger downloading of credentials that have not yet been received by the client device 310.

The request 344 may include data that authenticates or otherwise identifies the user 305 to the management system 320. For example, the request 344 may include data that identifies a user account for the application 312 and the user's associated password for the user account. The request 344 also includes the user token 342 provided by the issuer system 330. The request 344 may also provide other information to the management system 320, such as an identifier or URL for the issuer system 330 or the system access module 334, which may have been provided to the client device 310 by the issuer system 330.

During stage (E), the management system 320 transmits the user token 342 to the issuer system 330. For example, the management system 320 may transmit, in a standardized format recognized by the system access module 344, a request for any credentials associated with the user 305.

During stage (F), the issuer system 330 identifies the user 305 based on the received user token 342. For example, by comparing the received user token 342 to stored user tokens stored in the data repository 336, the issuer system 330 may determine that the received user token 342 matches the token issued to the user 305. Having identified the user 305, the issuer system 330 determines whether the user 305 is associated with any credentials. In the example, the issuer system 330 determines that the user 305 is associated with a credential.

During stage (G), the issuer system 330 provides the management system 320 with indications 346 of credentials associated with the user 305 (e.g., credentials which the user 305 possesses or is authorized to use, and which are granted to the user 305 by the issuer). In some implementations, the indications 346 of credentials provided by the issuer system 330 may indicate that the issuer system 330 requests client device data as part of issuing the credential to the user. For example, the issuer system 330 may indicate, for each of one or more credentials that should be issued to the client device 310, a type of client device data that should be collected from the client device 310. The indication that client device data should be collected can cause the management system 320 to collect the indicated client device data when credential(s) are downloaded to the client device 310.

The issuer system 330 can provide other information about the credentials in addition to indications 346 that identify credentials associated with the user 305. For example, the issuer system 330 can provide information that can be used to generate a visual representation of the credential to be displayed on the client device 310. In addition, or as an alternative, the information may enable a device to generate other representations of the credential, such as an ultrasonic signal, electromagnetic signal, infrared signal, or other output that includes information representing the credential. As another example, the information may include a name and/or photograph of the user 305, or other personal information. As another example, if the credential is an employee badge, the information can include information about the employee or the employer, such as information that identifies the employee's title, phone number, email address, office location, etc.

During stage (H), the management system 320 provides credential data 350 to the client device 310 for one or more credentials identified by the issuer system 330. The management system 320 can provide credential data 350 for each credential that has not already been received by the client device 310. The credential data 350 can be signed by the management system 320. For example, the credential data 350 can include data that the application 312 can use to verify that the credential data 350 is authentic. In some instances, the credential persists on the client device 310 and is usable for a particular amount of time or until the credential is revoked.

In some implementations, the credential data 350 permits the credential to become active or usable on the client device 310. For example, receipt of the credential data 350 may permit use of the corresponding credential, where the credential could not be accessed from the client device 310 before receiving the credential data 350. In other implementations, the credential data 350 may be provided after the credential was received by the client device 310. For example, the credential data 350 may include an updated version of a credential, a modification of a credential or associated permissions of the user 305, or a notification to the user 305 regarding the credential. In some implementations, the credential data 350 enables the client device 310 to generate a visual representation of the credential that may be displayed on the client device 310, or another representation of the credential that may be output by the client device 310. The credential data 350 may include a credential identifier or other data that may be used as a seed value to generate the representation.

In some implementations, credential data may be provided to the client device 310 automatically when an additional credential is available. Once the issuer has associated the credential with the user 305, the issuer system 330 can provide information regarding the new credential to the management system 320. For example, the issuer system 330 can provide the indication 346 of the user's credentials after the user's credentials change, rather than in response to the actions described for stages (A) through (F). Consequently, the management system 320, having information about the user's credentials, can provide any new credentials during any subsequent interaction with the client device 310. For example, the credential data 350 may be provided in response to the user 305 turning on the client device 310, logging in to the application 312, using the application 312 to access another credential, etc. In some implementations, credential data that provides and/or updates a credential, or information that such data is available, may be provided via push notifications to the client device 310.

Figure 4:
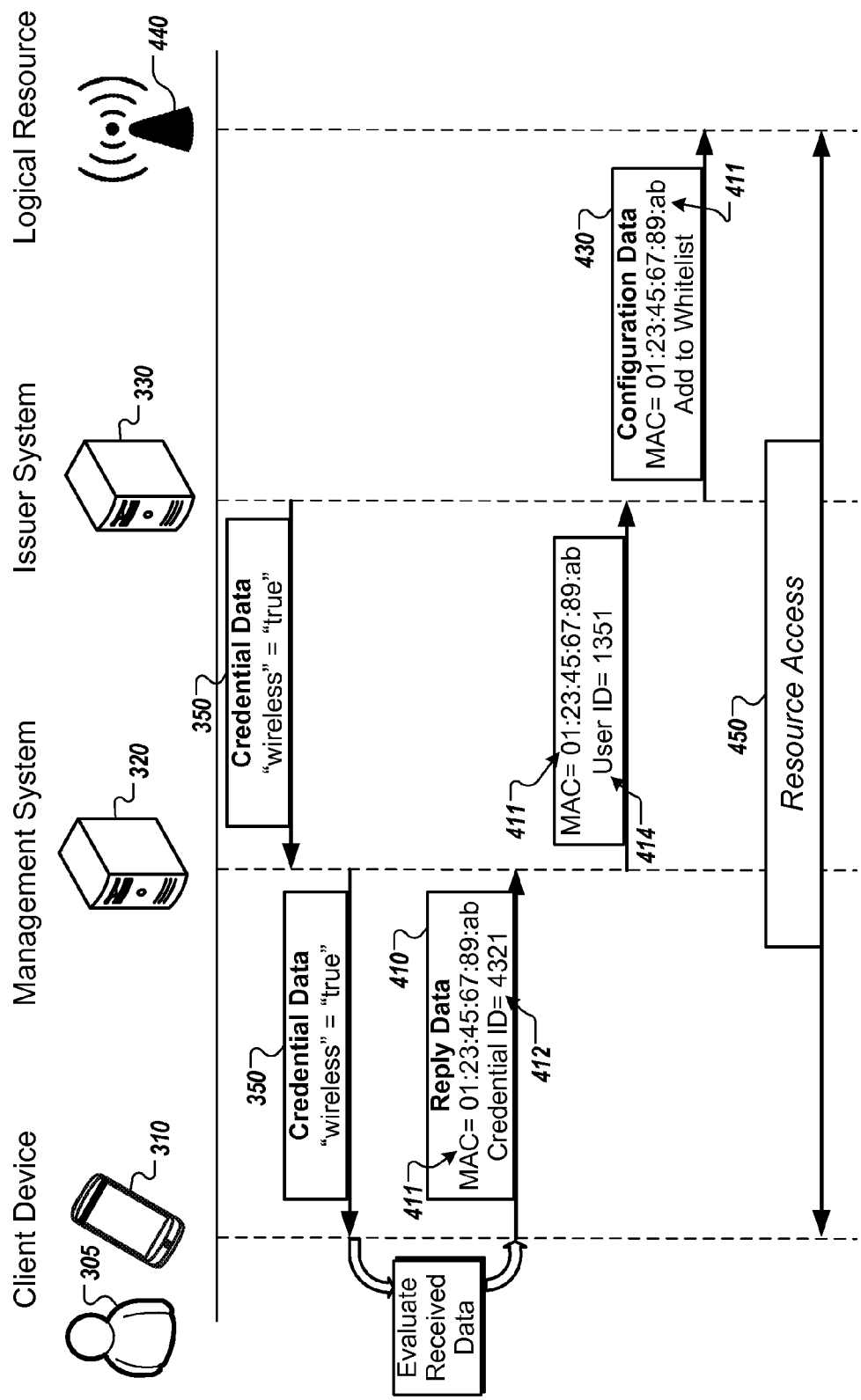
FIG. 4 is a diagram that illustrates examples of interactions in a system that acquires client device data.

FIG. 4 shows an example of client device data being captured when a credential is distributed to the client device 310. In some implementations, a credential is intended to provide a user with automated access to one or more logical resources (e.g., a Wi-Fi network). To facilitate this automated access, the process of distributing a credential to the client device 310 can include capturing client device data from the client device 310. The client device data may be captured by indicating, in a standardized format understood by the application 312 that provides credential management services, data that should be returned to the management system 320. The returned client device data can then be used to provide the user with automated access to a logical resource, such as the Wi-Fi network 440. In some implementations, the client device data may include any appropriate information about the hardware, firmware, software, or settings of the client device 310. In some implementations, the client device data may include information about the user 305 associated with the client device 310.

In the example illustrated in FIG. 4, the issuer system 330 generates the credential data 350 corresponding to the credential. The credential data 350 generated by the issuer system 330 may be the same as the credential data 350 illustrated in stage (G) of FIG. 3. The issuer of the credential can specify what data, if any, should be acquired from the client device 310 when the credential is received by the client device. For example, if the credential is intended to provide access to a Wi-Fi network, the credential data 350 can indicate that the MAC address for the Wi-Fi adapter of the client device 310 should be returned. As another example, if the credential allows pairing with a Bluetooth device, the credential data 350 can indicate that the MAC address for the Bluetooth adapter of the client device 310 and/or the Bluetooth pairing code for the Bluetooth adapter should be provided.

The credential data 350 may be transmitted in any suitable data structure, such as, for example, an eXtensible Markup Language (XML) or JavaScript Object Notation (JSON) object. In some implementations, one or more flags (e.g., data values in appropriate data fields) indicate user data to be collected. For example, to indicate that a credential authorizes access to a Wi-Fi network, and that the MAC address for the Wi-Fi adapter of a client device should be captured, the credential data 350 for the corresponding credential may include the following flag:

"wireless"="true";

When the value of the "wireless" flag is true, a client device returns its Wi-Fi MAC address. When the value of the "wireless" flag is false, or if the flag is omitted, the client device that receives the credential data will not provide its Wi-Fi MAC address. Other flags can indicate additional data or alternative data for client devices to provide.

After the issuer system 330 generates the credential data 350, the issuer system 330 sends the credential data 350 to the management system 320, which provides the credential data 350 to the client device 310. The client device 310 then evaluates the received credential data 350. For example, the client device 310 determines whether the "wireless" flag is present, and, if so, what the value is. After determining that the "wireless" flag has a value of "true," the client device 310 may identify the type of data associated with the flag (e.g., a Wi-Fi MAC address), and may determine the value for the identified data type (e.g., the particular value of the MAC address for the Wi-Fi adapter of the client device 310).

The client device 310 then transmits reply data 420 to the management system 320 in response to receiving the credential data 350. The reply data 420 includes the user data 411 indicated in the credential data 350, such as the Wi-Fi MAC address of the client device 310. The reply data 420 also includes credential identifying information 412 that identifies the credential that corresponds to the credential data 350, which is the credential that prompted the reply data 360 to be sent. The client device 310 may also provide data identifying the user 305 of the client device 310 (e.g., identifying the user account of the user 305).

When the management system 320 receives the reply data 410, the management system 320 identifies the issuer of the credential that prompted the reply data 360 to be sent. The management system 320 may identify the issuer based on the credential identifying information 412. The credential identifying information 412 enables the management system 320 to identify which issuer should receive the user data 411, out of potentially multiple issuers that may have issued credentials to the user. For example, the management system 320 may access information indicating issuers and the credentials that they issue, and may use the information to determine the issuer that corresponds to the credential indicated by the credential identifying information 412. Then, the management system 320 transmits the user data 411 to the identified issuer, for example, to the issuer system 330. The management system 320 also transmits a user identifier 414 for the user 305, so that the issuer system 330 can associate the user data 411 with the user 305.

The issuer system 330 then uses the received user data 411 to provide the client device 310 with access to one or more logical resources. For example, when the user data 411 includes a MAC address of the client device 310, the issuer system 330 can transmit configuration data 430, including the MAC address, to a Wi-Fi gateway. The configuration data 430 can indicate that the MAC address should be added to a whitelist of user devices that have received the issuer's credential and that should be automatically connected to the Wi-Fi network 440. Thereafter, when the client device 310 interacts with the Wi-Fi network 440, and a Wi-Fi gateway determines that the MAC address for the client device 310 is included in the whitelist, the client device 310 may be granted access automatically (indicated by resource access 450). Devices whose MAC addresses are not identified in the whitelist (e.g., devices that have not received the issuer's credential) may be required to perform an authentication procedure, or pay for access, or may simply be denied access to the Wi-Fi network 440.

The issuer system 330 may store the user data 411 and the user identifier 414 for the user 305 for later use in granting or revoking access to logical resources. For example, if additional resources become available, or if the credential grants permission to a broader set of resources, the issuer may update access control systems associated with the broader set of resources to provide additional access to the broader set of resources. As another example, the association of the user data 411 and the identity of the user 305 can be used to revoke the user's credential and/or to revoke the user's access to one or more logical resources. For example, if the user's credential expires, the issuer system 330 can delete the MAC address for the client device 310 and any other client devices associated with the user 305.

In some implementations, the management system 320 stores user information, such as MAC addresses of client devices that a user has registered with the credential management application. In such implementations, the management system 320 may evaluate credential data or other data from the issuer to determine what user data, if any, the issuer of a credential requests in connection with a credential. When an issuer indicates that a MAC address should be sent, for example, the management system 320 may provide a stored MAC address, in addition to, or instead of forwarding a MAC address that the client device 310 provides in response to receiving the credential data 350. As an example, when an issuer associates a new credential with a user and the credential authorizes access to a Wi-Fi network, the management system 320 may provide the Wi-Fi MAC addresses for each of multiple client devices that have been registered with the credential management application. In this manner, multiple client devices may be configured for automatic access, before the credential has been distributed to each of the client devices.

FIG. 5 shows an example of credential data 500 that can be transmitted to a client device, such as the client device 310, when a credential is distributed. The credential data 500 includes one or more credential identifiers 502, response-indicating data 510, which indicates information to provide in response to receiving the credential data 500, and access data 520, which enables the client device 310 to output one or more different representations of the credential. The credential data 500 may be transmitted in a single transmission or may be spread across multiple transmissions.

The response-indicating data 510 indicates one or more data items to return to the management system 320 in response to receiving the credential data 500. The response-indicating data 510 can be expressed in any appropriate form, such as in flags, values (e.g., text, numbers, binary values, etc.), objects, executable or interpretable instructions, and other forms. The data to return can be expressed in a standardized format that is consistent for multiple credentials accessible through a credential management application. For example, the response-indicating data 510 can include one or more flags selected from a set of flags with defined interpretations. Each flag may indicate one or more types of data to provide.

In the illustrated example, the response-indicating data 510 includes a wireless flag 512, a phone number flag 514, and a Bluetooth flag 516. Each flag 512, 514, 516 indicates that one or more corresponding data values should be returned to the management system 320. For example, the wireless flag 512 indicates that a MAC address for a Wi-Fi adapter of the client device 310 should be provided. The phone number flag 514 indicates that a phone number for the client device 310 should be provided. The Bluetooth flag 516 indicates that a MAC address for a Bluetooth adapter of the client device 310, and a pairing code for the Bluetooth adapter, should be provided. Other flags may be included, and other values indicated, in addition or as an alternative to those illustrated.

In some implementations, the response-indicating data 510 indicates that data about the client device 310 should be provided. For example, the response-indicating data may identify one or more device attributes, which may include information about hardware, firmware, software, usage, and/or environment of the client device 310. Examples of device attributes include device identifiers (e.g., phone numbers, MAC addresses, serial numbers, etc.), values indicating hardware capabilities (e.g., screen size, processing capability, device type, model number, device manufacturer code, etc.), and values indicating software capabilities (e.g., operating system identifiers, application identifiers, software version codes, etc.). Other examples include user settings and device configuration parameters (e.g., a language setting, a time zone setting, a carrier/network access provider setting, etc.).

In some implementations, the response-indicating data 510 may indicate information about the user 305 of the client device 310 that should be provided, in addition to or instead of information about the client device 310. For example, the response-indicating data 510 may indicate that a user account identifier, a social networking permissions token (e.g., data that grants permission to access a social networking platform on behalf of a user), or other user information be provided.

Referring still to FIG. 5, in some implementations, the access data 520 permits a credential management application to output a representation of the credential at the client device 310. The access data 520 can include credential identifiers, encoding parameters, synchronization parameters, and/or other data that permit the client device 310 to produce a representation of the credential. For example, the representation may be an alphanumeric code, a sound signal (e.g., an ultrasonic signal), an optical machine-readable representation (e.g., a barcode or a quick response (QR) code), a parametrically-generated graphical representation, an animated graphic representation, and/or a phrase. The client device 310 receiving the credential data 500 may have the capabilities to produce one or more of these types of representations. The received access data 520 may permit the client device 310 to output representations of one or more of these types that demonstrate possession of the credential.

As used herein, an alphanumeric code may be a sequence of numbers and/or letters (e.g., 4 to 24 characters) that is associated with a credential and a user. In some instances, a given numeric representation will only be valid for a certain time period.

As used herein, an optical machine-readable representation may be an arrangement of graphical elements that encode alphanumeric data, where the elements are arranged so that the data can be read by an optical scanner. For example, an optical machine-readable representation may be a bar code, a QR code, or an Aztec code, among other optical machine-readable representations.

As used herein, a sound signal may be an oscillation of pressure waves transmitted through the air that are modulated to encode information. Any suitable modulation scheme could be used, such as, for example, frequency shift keying (FSK) or phase-shift keying (PSK). In some implementations, the sound signal may be in the ultrasonic frequency range, e.g., greater than about 20 kHz. In some implementations, the sound signal may be in the audible frequency range, e.g., about 20 Hz to about 20 kHz.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In some implementations, the client device 310 can access a credential identifier (e.g., from the credential data 350 provided when the credential is downloaded to the client device 310) and a time (e.g., from a timing device of the client device 310), and generate a parametrically generated graphical representation for the credential using the credential identifier and time as seed values. Similarly, for validation, a processing system obtains a credential identifier and a time, and generates a parametrically generated graphical representation for the credential in the same manner. When the timing device at the processing system is synchronized with the timing device at client device the parameters generated at the processing system should be identical (or nearly identical) to those of the client device 310 when the credential identifiers are the same. The graphical representation generated by processing system should therefore match the graphical representation on the client device, allowing a validation entity to visually validate the credential on the client device 310.

As referred to herein, an animated graphical representation may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 310 may access the stored graphical representations by way of index values, where an index value may correspond to a single representation. In some implementations, the client device 310 obtains a credential identifier (e.g., from the credential data 350 provided when the credential is downloaded to the client device 310) and a time (e.g., from a timing device of the client device 310), and selects an animated graphical representation for the credential by using the credential identifier and the time to generate an index value. Similarly, for validation, the processing system obtains a credential identifier and a time, and selects an animated graphical representation for the credential in the same manner. When the timing device at the processing system is synchronized with the timing device at client device 310 the index values generated at the processing system should be substantially identical to those of the client device 310 when the credential identifiers are the same. The graphical representation selected by the validation system should therefore match (or nearly match) the graphical representation on the client device 310 allowing the validation entity to visually validate the credential on the client device 310.

As referred to herein, a phrase representation of a credential may be a sequence of two or more words selected from one or more dictionaries of words that need not form a grammatical construct. A dictionary as used herein is a data structure in which index values identify words. A given dictionary may include many thousands of different words. In some implementations, applications for credential validation executing on the client device 310 and a validation system can access a common set of dictionaries for generating phrases, so that when the applications reference the same index values in the same dictionaries, at substantially the same time, they can select the same phrases. Thus, the validation system displays the same phrase as the client device 310 which enables the validation entity to validate the phrase at the client device 310.

FIG. 6 shows an example of reply data 600 that can be transmitted by a client device, such as the client device 310, to a processing system, such as the management system 320, in response to receiving the credential data 500. The reply data 600 includes client device data 610, a credential identifier 620, and a user identifier 630. The reply data 600 may be sent in a single transmission, or may be spread across multiple transmissions.

The type of client device data 610 that is sent depends on the content of the response-indicating data 510. As a result, the client device 310 may provide different sets of client device data 610 in response to receiving different credentials. In the illustrated example, the client device data 610 includes the data indicated by the response-indicating data 510. Accordingly, based on the wireless flag 512, the client device data 610 includes the Wi-Fi MAC address 612 of the client device 310. Based on the phone number flag 514, the device data 510 includes the phone number 614 of the client device 310. Based on the Bluetooth flag 516, the device data 510 includes the Bluetooth MAC address 616 and the Bluetooth pairing code 618 of the client device 310.

The credential identifier 620 indicates the credential to which the credential data 500 corresponds. For example, the credential identifier 620 matches the credential identifier 502 received in the credential data 500. The credential identifier 620 may permit the management system 320 to identify the credential and credential issuer to which the reply data corresponds. The management system 320 can then relay the device data to the appropriate credential issuer, allowing the credential issuer to provide the client device 310 with access to logical resources.

The user identifier 630 may identify the user 305, for example, by indicating the user identity or user account for the user 305 in the credential management application. The user identifier 630 permits the management system 320 to associate the device data 510 with the user 305. The management system 320 may then provide data to the credential issuer that identifies the user 305, such as a user token, user name, etc. known to the credential issuer, allowing the credential issuer to associate the device data 510 with the user 305. In some implementations, other types of information may serve as the user identifier 630. For example, after the user 305 has been authenticated to the management system 320 using the client device 310, a session identifier for the communication session between the client device 310 and the management system 320 may serve to identify the user 305.

Figure 7:
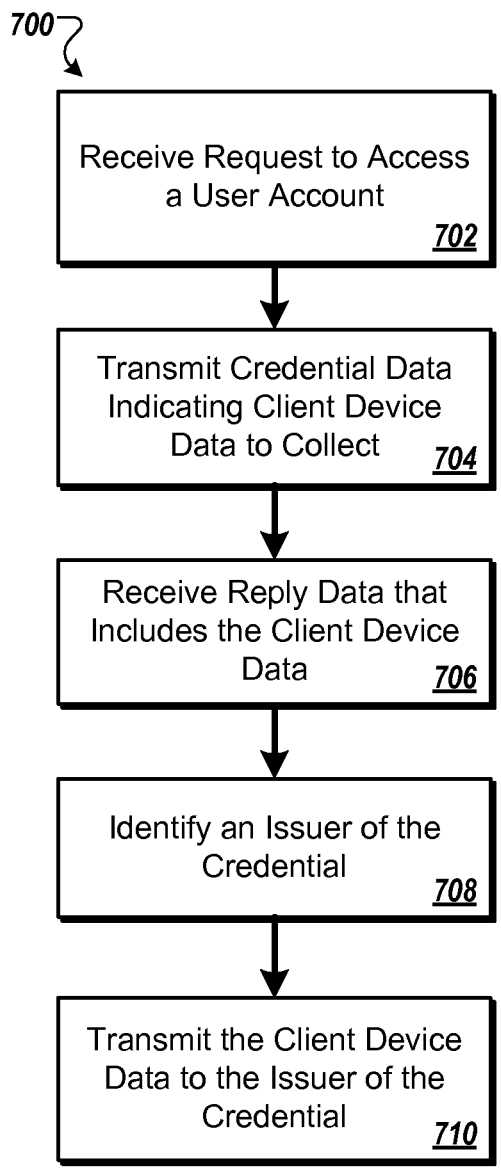
FIG. 7 is a flowchart of an example process for acquiring data from a client device.

FIG. 7 shows an example process 700 for acquiring client device data when distributing a credential to a client device. The process may be performed by one or more computing devices, for example, a server system such as the management system 320.

In step 702, the management system receives a request to access a user account of a user. The request may be received from a client device, such as the client device 310. The user account may provide access to one or more credentials associated with the user.

In step 704, in response to receiving the request, the management system 320 transmits credential data indicating client device data to collect from the client device 310. The credential data may correspond to a credential associated with the user. In some implementations, the credential data causes the credential to be distributed to (e.g., made active on or accessible by) the client device 310.

In some implementations, the credential data indicates that the client device 310 should transmit a device identifier of the client device in response to receiving the credential data. For example, the credential data may indicate that the client device 310 should transmit a MAC address of the client device, such as a MAC address for a Wi-Fi adapter, Ethernet adapter, Bluetooth adapter, or other network adapter of the client device 310. As another example, the credential data may indicate that a phone number of the client device 310 (e.g., the phone number assigned to the client device 310 for making and receiving phone calls or other data with the client device 310) should be provided to the management system 320. The credential data may indicate that multiple device identifiers and/or other information be provided in response to receiving the credential data.

In some implementations, the management system 320 receives credential data corresponding to the credential from the issuer of the credential, and then forwards the credential data to the client device 310. Credential data received from the issuer may indicate the device data that the client device 310 should provide. For example, credential data provided by the issuer may include one or more flags that specify attributes of the client device for which data should be collected. In some implementations, the issuer of the credential indicates to the management system 320 what data should be collected from the client device 310, and the management system 320 generates appropriate credential data to send to the client device 310. For example, based on input from the issuer indicating that a credential authorizes access to a Wi-Fi network, the management system 320 may generate the credential data to indicate that the Wi-Fi MAC address for the client device 310 should be sent. In a similar manner, if the issuer requests a particular type of data, the management system 320 may generate the credential data to indicate that the client device 310 should send that type of data.

In some implementations, the credential data enables an application to produce a representation of the credential at the client device. The representation of the credential can be capable of demonstrating possession of the credential. For example, the representation may provide data that allows a processing system of a validation entity to validate possession of the credential. The representation of the credential may be one or more of an alphanumeric code, a sound signal, an optical machine-readable representation, a parametrically-generated graphical representation, an animated graphic representation, and a phrase.

In step 706, the management system 320 receives reply data from the client device 310 including the client device data indicated by the credential data. The reply data is transmitted by the client device 310 in response to the client device receiving the credential data. In some implementations, the reply data includes credential identification information that identifies the credential to which the credential data corresponds. In some implementations, the reply data includes information that identifies a user of the client device 310. For example, the reply data may indicate a user account of the user.

In step 708, the management system 320 identifies an issuer of the credential. The management system 320 may identify the issuer of the credential to which the credential data corresponds based on credential identification information received from the client device 310. For example, based on the credential identification information, the management system 320 may determine which credential was distributed to the client device 310. The management system 320 can then access data indicating the issuer of that credential. As a result, the management system 320 can identify the issuer of the credential from among multiple credential issuers that distribute credentials using the management system 320, and from among multiple credential issuers that may grant credentials to the user of the client device 310.

In some implementations, the management system 320 identifies a processing system associated with the issuer of the credential. For example, the management system 320 may determine an electronic address, such as a network address or Uniform Resource Locator (URL), that may be used to communicate with a processing system associated with the issuer of the credential. The management system 320 may subsequently transmit data to the issuer using the electronic address.

In step 710, the management system 320 transmits the client device data to the issuer of the credential. The management system 320 may also transmit data identifying the user of the client device 310 to the issuer of the credential. For example, the management system 320 can indicate that the identified user is associated with the device data. In some implementations, the management system 320 may also indicate the particular credential that resulted in capture of the device data.

As discussed above, the issuer may then configure an access control system based on the device data to automatically grant the client device 310 access to one or more logical resources. When the credential is required to access a logical resource, the access control system can determine that the client device 310 is associated with the credential based on the client device 310 providing device data that matches the device data previously received. As a result, the access control system can automatically grant the client device 310 access to logical resources that the credential gives the user permission to access.

In some implementations, the process 700 is performed for each of multiple client devices that are associated with the user. Some or all steps of the process 700 may be repeated for a second client device, third client device, or further client devices. For example, a second client device may provide device data when it receives the same credential provided by the same issuer. When the management system 320 receives a request from the second client device to access the user account, the management system 320 provides credential data corresponding to the credential to the second client device. The credential data may indicate device data to return to the management system 320, which can be the same type of device data indicated in credential data sent to the client device 310 in step 704. The management system 320 receives reply data from the second client device, including device data from the second client device. For example, a MAC address or other identifier for the second client device may be received. The management system 320 identifies the issuer of the credential, for example, by determining that the reply data from the second client device was sent in response to credential data for the issuer's credential. The management system 320 then transmits the device data for the second client device to the issuer of the credential.

In some implementations, the process 700 is repeated when different credentials are distributed to a client device. As a result, a single client device may provide device data in response to receiving each of multiple different credentials. For example, after the management system transmits credential data for a first credential, the management system may transmit credential data corresponding to a second credential associated with the user. The second credential may be authorized by a second issuer that is different from the issuer of the first credential. The credential data corresponding to the second credential may indicate device data that the client device 310 should provide. The indicated device data may be the same as or different from the device data indicated by the credential data for the first. The management system 320 receives reply data from the client device 310, which includes the device data that was indicated in the credential data for the second credential. The management system 320 identifies the issuer of the second credential, and transmits the device data received in response to the credential data for the second credential to the issuer of the second credential. The issuer of the second credential may be different from the issuer of the first credential, or may be the same as the issuer of the first credential.

In some implementations, the management system 320 identifies a processing system associated with the issuer of the credential, such as the issuer system 330. The processing system may transmit the client device data to the issuer system 330. For example, when the client device data includes a device identifier, such as a MAC address, the management system 320 transmits the device identifier to the issuer system. The issuer system 330 can receive the device identifier from the management system 320, and may store the device identifier as an identifier for a device associated with the credential.

Later, the issuer system 330 may communicate with the client device and may receive a device identifier from the client device. The issuer system 330 may determine that the client device should be granted access to a wireless network or other logical resource based on the device identifier received from the client device. For example, the issuer system may determine that the device identifier received from the client device matches the stored device identifier received from the management system 320. In response to determining that the client device should be granted access to a wireless network based on the received device identifier, the issuer system 330 may provide the client device access to the wireless network or other logical resource.

In some implementations, the management system 320 receives user authentication data from the client device, and evaluates the user authentication data against data associated with the user account. The management system 320 can determine, based on the evaluation, that the user authentication data is valid to permit access to the user account. The management system 320 may transmit the credential data to the client device 310 in response to determining that the user authentication data is valid to permit access to the user account.

Figure 8:
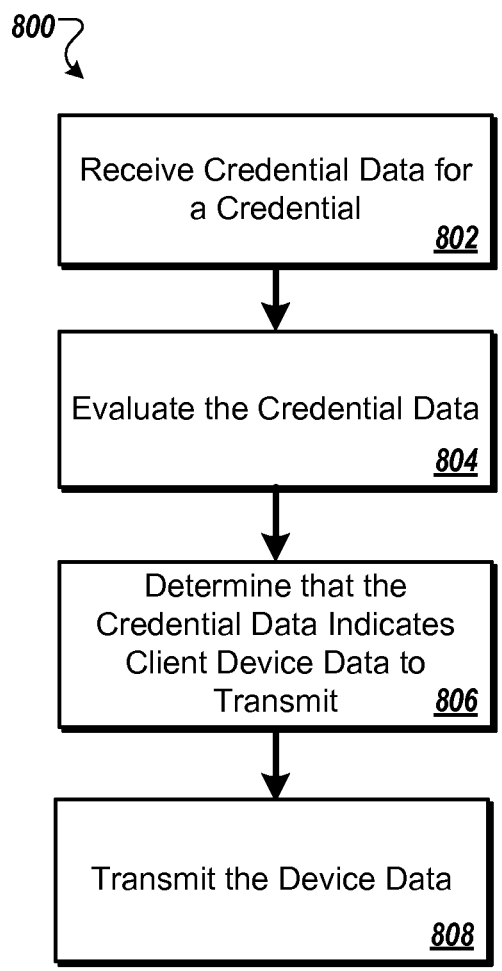
FIG. 8 is a flowchart of an example process for providing data to a server system.

FIG. 8 shows an example process 800 for providing client device data to a server system when a client device receives a credential. The process may be performed by one or more computing devices, for example, the client device 310.

In step 802, the client device 310 receives credential data for a credential associated with a user. The credential data may enable the user to access the credential at the client device 310. The credential data may indicate that a device identifier for the client device 310, such as a MAC address or phone number, should be sent in response to receiving the credential data.

In some implementations, the credential data enables the client device 310 (e.g., through an application accessible at the client device 310) to produce a representation of the credential at the client device 310, where the representation of the credential is capable of demonstrating possession of the credential. The credential data may enable the application to produce one or more representations of the credential, such as one or more of an alphanumeric code, a sound signal, an optical machine-readable representation, a parametrically-generated graphical representation, an animated graphic representation, and a phrase.

In step 804, the client device 310 evaluates the credential data. For example, the client device 310 may parse the credential data and identify one or more values (e.g., flags) that indicate one or more types of data that should be provided in response to receiving the credential data.

In step 806, based on evaluating the credential data, the client device 310 determines that the credential data indicates client device data to transmit to a server system. The server system may be associated with an application that provides the client device 310 with access to one or more credentials of the user. For example, the server system may be the management system 320. The management system 320 is an example of such a server system.

In some implementations, the client device determines, based on the evaluation, that a device identifier for the client device should be sent to the server system. The client device 310 may determine, based on the evaluation, that a MAC address for the client device should be sent to the server system. The client device 310 may determine, based on the evaluation, that a phone number for the client device should be sent to the server system.

In step 808, the client device 310 transmits the client device data indicated by the credential data to the server system. The data transmitted by the client device 310 may indicate the user and/or credential corresponding to the client device data. For example, the client device 310 may also transmit data that identifies the user of the client device 310 and/or the credential to which the credential data corresponds. The server system may be operated by an entity that is independent of the issuer of the credential.

For example, in response to determining that a device identifier should be sent to the server system, the client device 310 may transmit the device identifier to the server system. In response to determining that a MAC address for the client device should be sent to the server system, the client device 310 may transmit the MAC address to the server system. In response to determining that a phone number for the client device should be sent to the server system, the client device 310 may transmit the phone number to the server system.

In some implementations, the client device 310 receives a second credential, which may be granted by the same issuer as the first credential or a different issuer. For example, the client device 310 may receive second credential data corresponding to the second credential associated with the user, and the second credential data may enable the user to access the second credential at the client device 310. The client device 310 may evaluate the second credential data, and determine based on the evaluation of the second credential data that the second credential data indicates second client device data should be sent to the server system. In response to the determination, the client device 310 may transmit the second client device data to the server system. The second client device data (which is indicated by the second credential data) may be the same as or different from the client device data indicated by credential data for the first credential.

In some implementations, the credential data indicates client device data that an issuer of the credential has specified should be acquired. The client device 310 may transmit the client device data to a server system, such as the management system 320, that is independent of the issuer of the credential.

In some implementations, the client device 310 receives access to one or more logical resources based on the client device data. The client device 310 may receive automatic access to a logical resource, where the logical resource is configured to provide automatic access only to users or devices associated with the credential. For example, a logical resource may be configured to deny access to devices that have not received the credential, at least until a designated action is performed. The designated action may be a predetermined action, such as providing user input, submission of a representation of a credential, making a payment, indicating a user's identity, agreeing to terms of use, etc. The client device 310, which is associated with the credential, may receive access to the logical resource without performing the designated action based on the client device data sent when the credential was received by the client device 310. For example, when the client device 310 attempts to access a logical resource, a system that manages access to the logical resource can receive an identifier (e.g., MAC address) from the client device 310. The system can determine that the received identifier matches a stored identifier that was included in the client device data provided when the client device 310 received the credential. Because the received identifier matches the stored identifier known to be associated with the credential, the system can determine that the client device 310 is associated with the credential and should be provided automatic access to the logical resource. In this manner, access to one or more logical resources may be provided without any user input being provided to the client device 310 and/or without any representation of a credential being provided by the client device 310.

Figure 9:
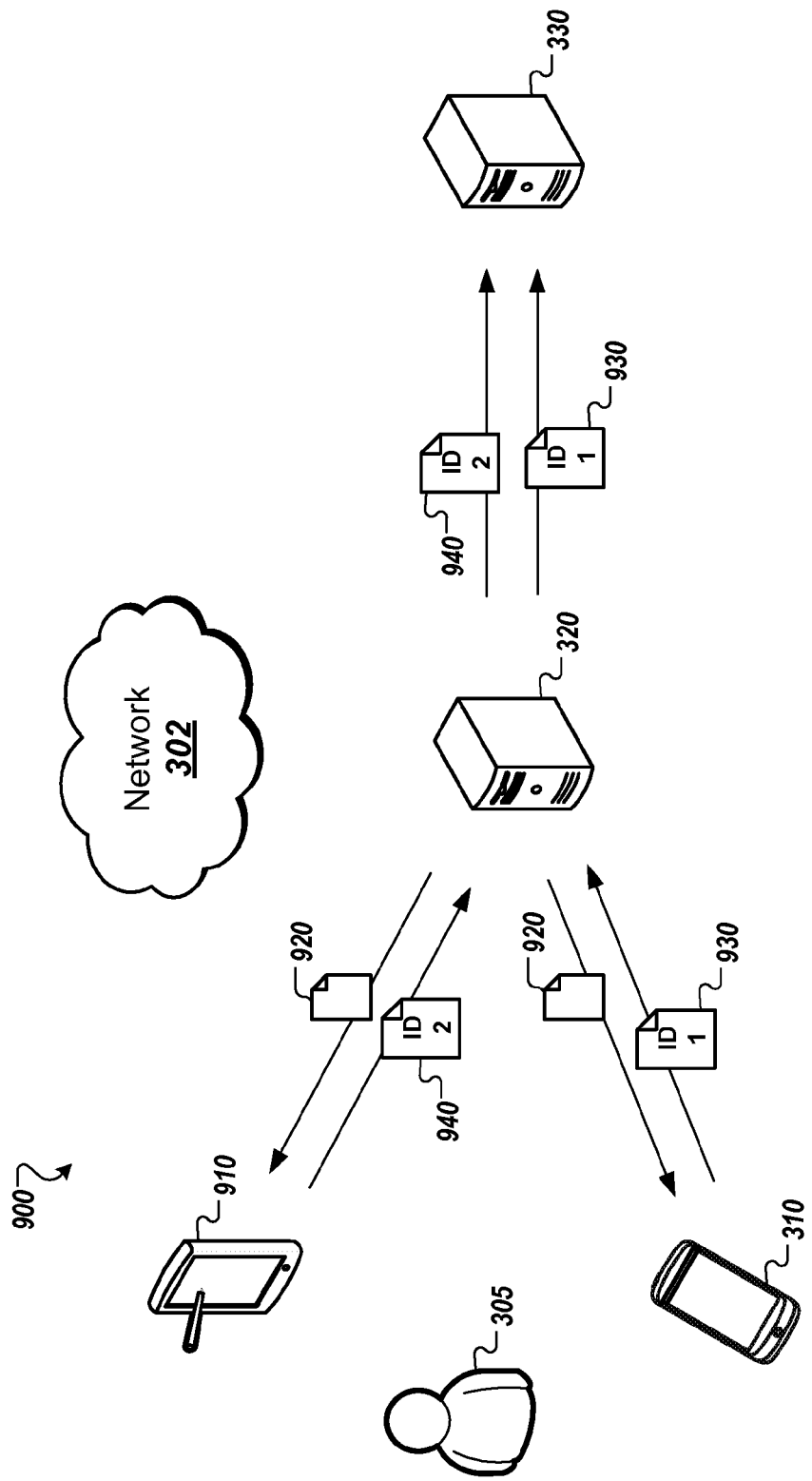
FIG. 9 is a diagram of an example system for obtaining data about multiple client devices.

FIG. 9 shows an example system 900 for obtaining data about multiple client devices. The diagram shows two client devices 310, 910, and each of the client devices 310, 910 receives a credential and provides client device data in response. In some implementations, as shown in FIG. 9, each client device that receives a credential may independently send client device data in response to receiving the credential. As a result, the issuer of the credential may obtain client device data for each device that receives the credential, including for multiple devices associated with a single user that receive the same credential.

The system 900 includes the client device 310, the management system 320, the issuer system 330, and a second client device 910, all of which communicate over the network 302. In the example, the second client device 910 is associated with the same user 305 as the client device 310. For example, the second client device 910 may access a user account that is the same as the user account for a credential management application accessed by the client device 310. As another example, both client devices 310, 910 may be registered with the management system 320 as being associated with the user 305.

The management system 320 distributes credential data 920 to each of the client devices 310, 910. In the example, the credential data 920 provides access to the same credential to both client devices 310, 910. The client devices 310, 910 each evaluate the credential data 920 and determine that client device data should be returned to the management system 320. In the illustrated example, each of the client devices 310, 910 independently determines that a particular device identifier, such as a MAC address, should be sent. In response, the client devices 310, 910 provide their respective device identifiers 930, 940 to the management system 320. For example, the client device 310 provides its MAC address, and the second client device 910 provides its MAC address, which is different from the MAC address for the client device 310.

The management system 320 receives the device identifiers 930, 940, as well as data from the client devices 310, 910 that identifies the credential corresponding to the credential data 920. After determining the issuer of the credential, the management system 320 forwards the device identifiers 930, 940 to the appropriate issuer system 330. The management system 320 indicates that the user 305 is associated with each of the device identifiers 930, 940. This information can be used by the issuer system 330 to manage access to logical resources by the client devices 310, 910 according to the status of the user's credential, which may change over time.

Figure 10:
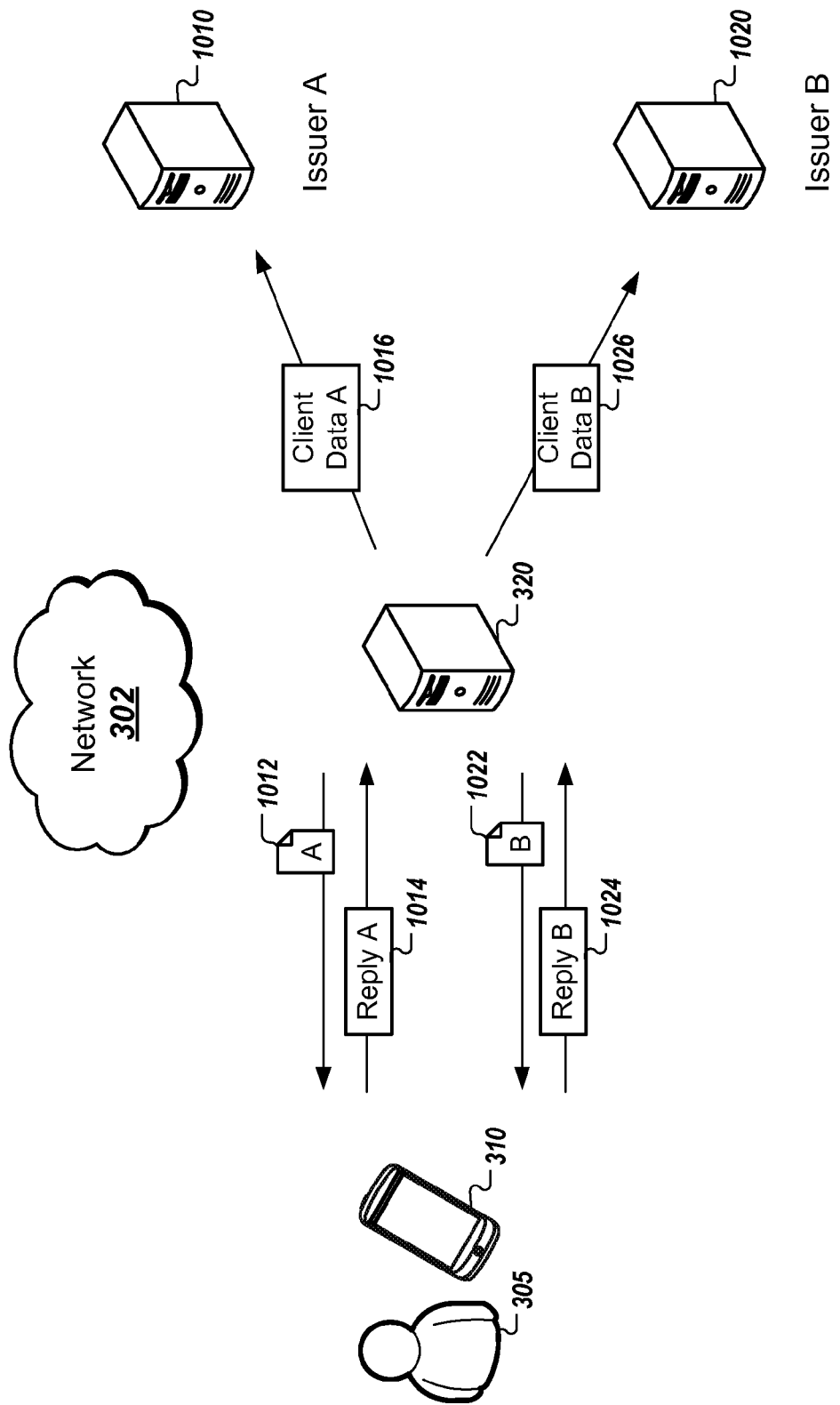
FIG. 10 is a diagram of an example system for obtaining data about a client device for multiple credentials.

FIG. 10 shows an example system 1000 for obtaining data about a client device for multiple credentials. In the example, the user 305 of the client device 310 has been associated with two different credentials, which are provided by two different issuers (denoted respectively as "Issuer A" and "Issuer B"). The client device 310 provides information in response to receiving each of the two credentials. That is, receipt of each credential prompts a separate reply corresponding to that credential.

In further detail, the management system 320 provides credential data 1012 for a first credential to the client device 310. The credential data 1012 indicates a first set of one or more data items that should be obtained from the client device 310 on behalf of the issuer of the first credential (e.g., "Issuer A"). In response, the client device 310 transmits reply data 1014, which identifies the first credential and includes the first set of data items indicated by the credential data 1012.

The management system 320 also provides credential data 1022 for a second credential to the client device 310. The credential data 1022 indicates a second set of one or more data items that should be obtained from the client device 310 on behalf of the issuer of the second credential (e.g., "Issuer B"). In response, the client device 310 transmits reply data 1024, which identifies the second credential and includes the second set of data items indicated by the credential data 1022.

The management system 320 identifies the issuer of the first credential and the issuer of the second credential, and provides the appropriate client device data to each issuer. For example, the management system 320 provides the first set of data items, as specified by the credential data 1012, as client data A to a processing system 1010 for Issuer A. The management system 320 provides the second set of data items, as specified by the credential data 1022, as client data B 1026 to a processing system 1020 for Issuer B.

Because different credentials permit access to different types of logical resources, the credential data 1012 and the credential data 1022 may instruct the client device 310 to provide different types of data. For example, the credential data 1012 for the first credential may specify a MAC address for a Wi-Fi adapter, and the credential data 1022 for the second credential may specify a MAC address for a Bluetooth adapter. As a result, the client data A 1016 and the client data B 1026 may include different sets of data about the client device 310 or the user 305.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The storage devices and media may store data in a non-transitory manner. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A system comprising:
a first processing system comprising one or more processors and one or more machine-readable data storage devices; and
a second processing system comprising one or more processors and one or more machine-readable data storage devices;
wherein the first processing system is configured to perform operations comprising:
receiving a request from a client device to access a user account of a user, wherein the user account provides access to one or more credentials associated with the user;
in response to receiving the request from the client device to access the user account of the user, transmitting, to the client device, credential data corresponding to a credential associated with the user, the credential data instructing the client device to transmit a device identifier in response to receiving the credential data;
receiving reply data transmitted by the client device in response to receiving the credential data, the reply data comprising a device identifier of the client device;
in response to receiving the reply data, determining that the second processing system is associated with an issuer of the credential to which the credential data corresponds; and
in response to determining that the second processing system is associated with the issuer of the credential to which the credential data corresponds, transmitting the device identifier of the client device to the second processing system; and
wherein the second processing system is configured to perform operations comprising:
receiving, from the first processing system, the device identifier of the client device;
receiving a device identifier from the client device;
determining that the device identifier received from the client device matches the device identifier received from the first processing system;
determining that the client device should be granted access to a wireless network based on having determined that the device identifier received from the client device matches the device identifier received from the first processing system; and
in response to determining that the client device should be granted access to a wireless network, providing the client device access to the wireless network.

2. A system comprising:
at least one processor; and
at least one non-transitory computer-readable medium coupled to the at least one processor, the at least one non-transitory computer-readable medium having stored thereon instructions that, when executed by the at least one processor, cause the at least one processor to perform operations comprising:
receiving a request from a client device to access a user account of a user, wherein the user account provides access to one or more credentials associated with the user;
in response to receiving the request from the client device to access the user account of the user, transmitting, to the client device, credential data corresponding to a credential associated with the user, the credential data indicating client device data to transmit in response to receiving the credential data;
receiving reply data transmitted by the client device in response to receiving the credential data, the reply data comprising the client device data indicated by the credential data;
in response to receiving the reply data, identifying an issuer of the credential to which the credential data corresponds;
transmitting the client device data to the issuer of the credential;
receiving a request from a second client device to access the user account, the second client device being different from the first device;
in response to receiving the request from the second client device to access the user account of the user, transmitting, to the second client device, second credential data corresponding to the credential, the second credential data indicating client device data about the second client device to transmit in response to receiving the second credential data;
receiving second reply data transmitted by the second client device in response to receiving the second credential data, the second reply data comprising the second client device data indicated by the second credential data;
in response to receiving the second reply data, identifying the issuer of the credential to which the second credential data corresponds; and
transmitting the second client device data to the issuer of the credential.

3. The system of claim 2, wherein in response to receiving the request from the client device to access the user account of the user, transmitting, to the client device, the credential data corresponding to the credential associated with the user, the credential data indicating the client device data to transmit in response to receiving the credential data comprises, in response to receiving the request from the client device to access the user account of the user, transmitting, to the client device, credential data indicating that the client device should transmit a device identifier for the client device in response to receiving the credential data;
wherein receiving the reply data transmitted by the client device in response to receiving the credential data, the reply data comprising the client device data indicated by the credential data comprises receiving a device identifier for the client device; and wherein transmitting the client device data to the issuer of the credential comprises transmitting the received device identifier for the client device to the issuer of the credential.

4. The system of claim 3, wherein in response to receiving the request from the client device to access the user account of the user, transmitting, to the client device, credential data indicating that the client device should transmit the device identifier for the client device in response to receiving the credential data comprises in response to receiving the request from the client device to access the user account of the user, transmitting, to the client device, credential data indicating that the client device should transmit a MAC address of the client device in response to receiving the credential data;
wherein receiving the device identifier for the client device comprises receiving a MAC address of the client device; and
wherein transmitting the received device identifier for the client device to the issuer of the credential comprises transmitting the received MAC address of the client device to the issuer of the credential.

5. The system of claim 3, wherein in response to receiving the request from the client device to access the user account of the user, transmitting, to the client device, credential data indicating that the client device should transmit the device identifier for the client device in response to receiving the credential data comprises in response to receiving the request from the client device to access the user account of the user, transmitting, to the client device, credential data indicating that the client device should transmit a phone number of the client device in response to receiving the credential data;
wherein receiving the device identifier for the client device comprises receiving a phone number of the client device; and
wherein transmitting the received device identifier for the client device to the issuer of the credential comprises transmitting the received phone number of the client device to the issuer of the credential.

6. The system of claim 2, wherein receiving the reply data transmitted by the client device in response to receiving the credential data, the reply data comprising the client device data that is indicated by the credential data comprises receiving the reply data transmitted by the client device in response to receiving the credential data, the reply data comprising the client device data and credential identification data that identifies the credential to which the credential data corresponds; and
wherein, in response to receiving the reply data, identifying the issuer of the credential to which the credential data corresponds comprises identifying the issuer of the credential to which the credential data corresponds based on the received credential identification information.

7. The system of claim 2, further comprising transmitting, to the issuer of the credential, data that identifies the user of the client device associated with the client device data.

8. The system of claim 2, further comprising:
transmitting, to the client device, additional credential data corresponding to a additional credential that is different from the first credential, the additional credential data indicating additional client device data to transmit in response to receiving the additional credential data;
receiving additional reply data transmitted by the client device in response to receiving the additional credential data, the additional reply data comprising the additional client device data indicated by the additional credential data;
in response to receiving the additional reply data, identifying the issuer of the credential to which the additional credential data corresponds; and
transmitting the additional client device data to the issuer of the additional credential.

9. The system of claim 2, further comprising:
receiving, from the issuer of the credential, data indicating one or more device attributes to acquire from client devices that receive access to the credential; and
in response to receiving, from the issuer of the credential, the data indicating the one or more device attributes to acquire from client devices that receive access to the credential, generating the credential data to indicate that the client device should provide values corresponding to the one or more device attributes in response to receiving the credential data.

10. The system of claim 2, wherein transmitting, to the client device, the credential data corresponding to the credential associated with the user, the credential data indicating client device data to transmit in response to receiving the credential data comprises transmitting, to the client device, credential data that enables an application to produce a representation of the credential at the client device, the representation of the credential being capable of demonstrating possession of the credential.

11. The system of claim 10, wherein transmitting, to the client device, credential data that enables an application to produce a representation of the credential at the client device comprises transmitting, to the client device, credential data that enables an application to produce, as a representation of the credential, one or more of an alphanumeric code, a sound signal, an optical machine-readable representation, a parametrically-generated graphical representation, an animated graphic representation, and a phrase.

12. The system of claim 10, wherein identifying an issuer of the credential to which the credential data corresponds comprises:
identifying an issuer of the credential that is independent of an entity that administers the user account; and
determining an electronic address for a computing system associated with the issuer of the credential; and
wherein transmitting the client device data to the issuer of the credential comprises transmitting the client device data to the electronic address.

13. At least one non-transitory computer-readable storage medium storing executable instructions that, when executed by at least one processor, cause the at least one processor to perform operations comprising:
receiving a request from a client device to access a user account of a user, wherein the user account provides access to one or more credentials associated with the user;
in response to receiving the request from the client device to access the user account of the user, transmitting, to the client device, credential data corresponding to a credential associated with the user, the credential data indicating client device data to transmit in response to receiving the credential data;
receiving reply data transmitted by the client device in response to receiving the credential data, the reply data comprising the client device data indicated by the credential data;
in response to receiving the reply data, identifying an issuer of the credential to which the credential data corresponds;
transmitting the client device data to the issuer of the credential;

receiving a request from a second client device to access the user account, the second client device being different from the first device;

in response to receiving the request from the second client device to access the user account of the user, transmitting, to the second client device, second credential data corresponding to the credential, the second credential data indicating client device data about the second client device to transmit in response to receiving the second credential data;

receiving second reply data transmitted by the second client device in response to receiving the second credential data, the second reply data comprising the second client device data indicated by the second credential data;

in response to receiving the second reply data, identifying the issuer of the credential to which the second credential data corresponds; and transmitting the second client device data to the issuer of the credential.

14. The at least one non-transitory computer-readable storage medium of claim 13, wherein in response to receiving the request from the client device to access the user account of the user, transmitting, to the client device, the credential data corresponding to the credential associated with the user, the credential data indicating the client device data to transmit in response to receiving the credential data comprises, in response to receiving the request from the client device to access the user account of the user, transmitting, to the client device, credential data indicating that the client device should transmit a device identifier for the client device in response to receiving the credential data;

wherein receiving the reply data transmitted by the client device in response to receiving the credential data, the reply data comprising the client device data indicated by the credential data comprises receiving a device identifier for the client device; and wherein transmitting the client device data to the issuer of the credential comprises transmitting the received device identifier for the client device to the issuer of the credential.

15. The at least one non-transitory computer-readable storage medium of claim 14, wherein in response to receiving the request from the client device to access the user account of the user, transmitting, to the client device, credential data indicating that the client device should transmit the device identifier for the client device in response to receiving the credential data comprises in response to receiving the request from the client device to access the user account of the user, transmitting, to the client device, credential data indicating that the client device should transmit a MAC address of the client device in response to receiving the credential data;

wherein receiving the device identifier for the client device comprises receiving a MAC address of the client device; and wherein transmitting the received device identifier for the client device to the issuer of the credential comprises transmitting the received MAC address of the client device to the issuer of the credential.

16. The at least one non-transitory computer-readable storage medium of claim 14, wherein in response to receiving the request from the client device to access the user account of the user, transmitting, to the client device, credential data indicating that the client device should transmit the device identifier for the client device in response to receiving the credential data comprises in response to receiving the request from the client device to access the user account of the user, transmitting, to the client device, credential data indicating that the client device should transmit a phone number of the client device in response to receiving the credential data;

wherein receiving the device identifier for the client device comprises receiving a phone number of the client device; and wherein transmitting the received device identifier for the client device to the issuer of the credential comprises transmitting the received phone number of the client device to the issuer of the credential.

17. A method performed by one or more processors, the method comprising:

receiving a request from a client device to access a user account of a user, wherein the user account provides access to one or more credentials associated with the user;

in response to receiving the request from the client device to access the user account of the user, transmitting, to the client device, credential data corresponding to a credential associated with the user, the credential data indicating client device data to transmit in response to receiving the credential data;

receiving reply data transmitted by the client device in response to receiving the credential data, the reply data comprising the client device data indicated by the credential data;

in response to receiving the reply data, identifying an issuer of the credential to which the credential data corresponds;

transmitting the client device data to the issuer of the credential;

receiving a request from a second client device to access the user account, the second client device being different from the first device;

in response to receiving the request from the second client device to access the user account of the user, transmitting, to the second client device, second credential data corresponding to the credential, the second credential data indicating client device data about the second client device to transmit in response to receiving the second credential data;

receiving second reply data transmitted by the second client device in response to receiving the second credential data, the second reply data comprising the second client device data indicated by the second credential data;

in response to receiving the second reply data, identifying the issuer of the credential to which the second credential data corresponds; and transmitting the second client device data to the issuer of the credential.

18. The method of claim 17, wherein in response to receiving the request from the client device to access the user account of the user, transmitting, to the client device, the credential data corresponding to the credential associated with the user, the credential data indicating the client device data to transmit in response to receiving the credential data comprises, in response to receiving the request from the client device to access the user account of the user, transmitting, to the client device, credential data indicating that the client device should transmit a device identifier for the client device in response to receiving the credential data;

wherein receiving the reply data transmitted by the client device in response to receiving the credential data, the reply data comprising the client device data indicated by the credential data comprises receiving a device identifier for the client device; and wherein transmitting the client device data to the issuer of the credential comprises transmitting the received device identifier for the client device to the issuer of the credential.

19. The method of claim 18, wherein in response to receiving the request from the client device to access the user account of the user, transmitting, to the client device, credential data indicating that the client device should transmit the device identifier for the client device in response to receiving the credential data comprises in response to receiving the request from the client device to access the user account of the user, transmitting, to the client device, credential data indicating that the client device should transmit a MAC address of the client device in response to receiving the credential data;
  wherein receiving the device identifier for the client device comprises receiving a MAC address of the client device; and
  wherein transmitting the received device identifier for the client device to the issuer of the credential comprises transmitting the received MAC address of the client device to the issuer of the credential.

* * * * *